US012382551B2

(12) United States Patent
Chamberlain

(10) Patent No.: US 12,382,551 B2

(45) Date of Patent: Aug. 5, 2025

(54) GLAZING, METHOD OF MANUFACTURING SAID GLAZING AND USE OF SAID GLAZING

(71) Applicant: Pilkington Group Limited, Nr. Ormskirk (GB)

(72) Inventor: Mark Andrew Chamberlain, Ormskirk (GB)

(73) Assignee: Pilkington Group Limited, Nr. Ormskirk (GB)

( * ) Notice: Subject to any disclaimer, the term of this patent is extended or adjusted under 35 U.S.C. 154(b) by 636 days.

(21) Appl. No.: 17/792,067

(22) PCT Filed: Jan. 12, 2021

(86) PCT No.: PCT/GB2021/050062

§ 371 (c)(1),
(2) Date: Jul. 11, 2022

(87) PCT Pub. No.: WO2021/144558

PCT Pub. Date: Jul. 22, 2021

(65) Prior Publication Data

US 2023/0052198 A1 Feb. 16, 2023

(30) Foreign Application Priority Data

Jan. 13, 2020 (GB) ...................................... 2000442

(51) Int. Cl.
*H05B 3/84* (2006.01)

(52) U.S. Cl.
CPC ......... *H05B 3/84* (2013.01); *H05B 2203/008* (2013.01); *H05B 2203/011* (2013.01)

(58) Field of Classification Search
CPC ........................................................ H05B 3/84
See application file for complete search history.

(56) References Cited

U.S. PATENT DOCUMENTS

| | | | | |
|---|---|---|---|---|
| 7,132,625 B2 * | 11/2006 | Voeltzel | ............ | B32B 17/10036 219/541 |
| 8,451,182 B2 * | 5/2013 | Bekraoui | ............. | H01Q 1/1278 343/704 |

(Continued)

FOREIGN PATENT DOCUMENTS

| | | |
|---|---|---|
| EP | 3190858 A1 | 7/2017 |
| EP | 3486225 A1 | 5/2019 |

(Continued)

OTHER PUBLICATIONS

Notices for Reasons for Refusal issued on Dec. 14, 2024, by the Japanese Patent Office in corresponding Japanese Patent Application No. 2022-542779 and an English translation of the Notice. (14 pages).

(Continued)

*Primary Examiner* — Woody A Lee, Jr.
(74) *Attorney, Agent, or Firm* — BUCHANAN INGERSOLL & ROONEY PC

(57) ABSTRACT

A glazing comprises first and second busbars for connection to an electrical supply; a third busbar between the first and second busbars; plural conductors electrically connected to the first busbar; wherein a first group of the conductors extends from the first busbar to the third busbar to form a first resistor; a second group of the conductors extends from a side of the third busbar facing the second busbar and is electrically connected to the second busbar to form a second resistor; fewer conductors extend from the side of the third busbar facing the second busbar than extend from a side of the third busbar facing the first busbar; at least one gap on one side of the third busbar opposite a conductor on the other side and an information acquisition area between the third busbar and the second busbar, the at least one gap being outside the information acquisition area.

10 Claims, 4 Drawing Sheets

(56) References Cited

U.S. PATENT DOCUMENTS

| | | | | |
|---|---|---|---|---|
| 8,471,177 | B2 * | 6/2013 | Chaussade | B32B 17/10761 219/544 |
| 8,841,585 | B2 | 9/2014 | Offermann et al. | |
| 9,573,846 | B2 * | 2/2017 | Schall | B32B 17/10036 |
| 10,237,922 | B2 * | 3/2019 | Kagaya | H05B 3/0004 |
| 10,536,994 | B2 * | 1/2020 | Guillaume | B32B 17/10174 |
| 10,703,072 | B2 * | 7/2020 | Klein | B32B 17/10036 |
| 11,575,192 | B2 * | 2/2023 | Tokuda | H01Q 1/1278 |
| 11,813,821 | B2 * | 11/2023 | Mannheim Astete | B32B 3/266 |
| 11,840,049 | B2 * | 12/2023 | Nishioka | B32B 17/10293 |
| 2004/0200821 | A1 * | 10/2004 | Voeltzel | H05B 3/86 219/203 |
| 2005/0045613 | A1 * | 3/2005 | Maeuser | B32B 17/10036 219/203 |
| 2010/0258547 | A1 * | 10/2010 | Chamberlain | H05B 3/84 219/203 |
| 2012/0103961 | A1 | 5/2012 | Offermann et al. | |
| 2012/0193341 | A1 | 8/2012 | Reul et al. | |
| 2020/0230923 | A1 | 7/2020 | Nishioka | |
| 2020/0374987 | A1 | 11/2020 | Yasuda et al. | |
| 2021/0001695 | A1 | 1/2021 | Ogawa et al. | |
| 2023/0225016 | A1 * | 7/2023 | Mourou | H05B 3/86 219/203 |
| 2023/0387567 | A1 * | 11/2023 | Nakata | H05B 3/84 |

FOREIGN PATENT DOCUMENTS

| | | | |
|---|---|---|---|
| JP | 2012-533838 | A | 12/2012 |
| JP | 2017212148 | A | 11/2017 |
| JP | 2019-77571 | A | 5/2019 |
| WO | 2018055390 | A1 | 3/2018 |
| WO | 2019/078258 | A1 | 4/2019 |
| WO | 2019107460 | A1 | 6/2019 |
| WO | 2019131928 | A1 | 7/2019 |

OTHER PUBLICATIONS

International Search Report (PCT/ISA/210) and Written Opinion (PCT/ISA/237) mailed on Apr. 12, 2021, by the European Patent Office as the International Searching Authority for International Application No. PCT/GB2021/050062. (10 pages).

Patents Act 1977:Search Report under Section 17(5) mailed on Jul. 9, 2020 by the Intellectual Property Office in corresponding Great Britain Patent Application No. 2000442.0. (3 pages).

* cited by examiner

GLAZING, METHOD OF MANUFACTURING SAID GLAZING AND USE OF SAID GLAZING

FIELD OF THE INVENTION

The invention concerns a glazing comprising conductors, a method of manufacturing said glazing and use of said glazing.

PRIOR ART DOCUMENTS

Glazings comprising heated electrical conductors are known for demisting and defrosting. For example, heated wired glazing is used in motor vehicles for windshields, rear windows, side windows and roof windows.

JP2017212148A (Ogawa) discloses two heaters in a vehicle glazing, each connected to its own busbars. The first heater is in an information acquisition area. The second heater is in an area other than the information acquisition area. The information acquisition area is used for an information acquisition device capable of obtaining information from outside the vehicle by receiving light. An example is a camera using visible light or infra-red light. First and second heaters are prepared on a release film. An adhesive layer is deposited thereon forming a transfer sheet. After transferring to either surface of an outer glass plate or inner glass plate of the glazing, the release layer is peeled off and the adhesive layer dissolved.

EP3486225A1 (Ogawa) discloses two regions for heat generation, each comprising a plurality of heating lines extending in the up-down direction and connected to common busbars. First heating lines pass over a window portion (information acquisition region) in a central region. Second heating lines are arranged in side regions on both sides parallel to the first heating lines. Width of the heating lines is reduced near the window portion for more effective defogging. Width of heating lines is increased in other regions to reduce the amount of heat generation. WO2019107460A1 (Ogawa) discloses a windshield.

WO2018055390A1 (Day) and WO2019131928A1 (Yasuda) disclose a wire-heated window having a wire-free area located inside a conductive member or "busbar ring".

An object of the present invention is to provide an alternative glazing which achieves faster defogging or defrosting in a required region.

A further object of the present invention is to provide a method of manufacturing such a glazing.

SUMMARY OF THE INVENTION

The present invention provides, in a first aspect, a glazing according to claim 1.

The glazing comprises at least one gap on one side of the third busbar opposite a conductor on the other side.

Preferably, the glazing comprises a fourth busbar positioned between the third busbar and the second busbar wherein the second group of conductors extends to the fourth busbar to form the second resistor and a third group of conductors extends from the fourth busbar to the second busbar to form a third resistor.

Preferably, in the glazing, more conductors extend from a side of the fourth busbar facing the second busbar than extend from a side of the fourth busbar facing the third busbar.

In the glazing, an information acquisition area is arranged between the third busbar and the second busbar.

Preferably, the information acquisition area is arranged between the third busbar and the fourth busbar.

In the glazing, fewer conductors extend from a side of the third busbar facing the second busbar than extend from a side of the third busbar facing the first busbar outside the information acquisition area.

Preferably, the at least one gap is positioned outside the information acquisition area.

Preferably, the conductors are heating wires.

Preferably, a group of conductors extends from the first busbar to the second busbar to form a parallel resistor, or a split busbar to form a split busbar parallel resistor and a distance between the first busbar and the split busbar is selected to be different from a distance between the first busbar and the second busbar.

Preferably, a power density in a region of the second resistor is greater than a power density of the first resistor or the parallel resistor or the split busbar parallel resistor, or any combination thereof.

Preferably, the glazing comprises outer and inner plies of glazing material and a ply of interlayer material therebetween to form a laminated glass wherein first and second resistors are between the ply of interlayer material and the inner ply of glazing material. Conductors may be in contact with outer or inner plies of glazing material, or an additional ply of interlayer material.

The glazing may have any suitable shape, for example trapezoidal, rectangular or triangular. Glazing thickness including all glazing material, interlayer material and conductors may be any thickness, for example 2.5 mm to 10.6 mm, preferably 2.6 mm to 3.8 mm, more preferably 2.7 mm to 3.2 mm. Glazing material may be any suitable material, for example soda-lime-silica glass or borosilicate glass.

The outer ply of glazing material may be any thickness, for example, to suit a requirement for durability and impact resistance against flying stones. On the other hand, as thickness increase, weight increases, which is undesirable. The outer ply of glazing material thickness may be 1.6 mm to 2.5 mm, more preferably 1.9 mm to 2.1 mm.

The inner ply of glazing material may be any thickness, for example, to suit a requirement to reduce weight of the glazing. The inner ply of glazing material thickness may be less than the outer ply of glazing material thickness, for example 0.6 mm to 2.1 mm, more preferably 0.8 mm to 1.6 mm, most preferably 0.8 to 1.3 mm.

The glazing may comprise two or more plies of interlayer material. The interlayer material may be polyvinyl butyral (PVB) which is advantageous because it exhibits good adhesion after lamination to glass and allows conductors in the form of wires to be embedded during manufacture. PVB thickness may be any thickness, for example 0.76 mm.

The conductors may be any material, for example wires of copper, tungsten, silver, gold, aluminium and alloys thereof. Conductors may have any resistivity, for example 116 ohm/m. Conductors may have any shape in cross-section, for example circle or rectangle, and any thickness, for example 30 μm or less, or any width, for example 30 μm or less.

Conductors may be of any shape on the glazing, for example linear or a wavy shape, such as a sine wave. Wavy conductors may have any amount of extension of path length, for example 107%. Conductors may be crimped wires. Conductors may have any pitch, i.e. spacing of adjacent wires, for example greater than or equal to 1.25 mm, preferably 1.8 mm to 4.5 mm, more preferably 2 mm to 2.6 mm. Conductors may be parallel or fanned with different spacing at the top and bottom of the window.

The present invention provides, in a second aspect, a method of manufacturing a glazing according to claim 10.

Preferably, the method of manufacturing a glazing further comprises a step of removing at least a part of at least one conductor on one side of the third busbar to form a gap in the second resistor.

Conductors may be removed by any method, for example laser ablation, ultrasonic cutting, ablation by passing electric current, or cutting with a knife.

The plurality of conductors in the form of wires may be embedded in the ply of interlayer material using a wire laying apparatus. The wire laying apparatus may bend the wire to provide crimped wire and embed the wire in the ply of interlayer material using a pressure roller.

The present invention provides, in a third aspect, use of a glazing in a motor vehicle as a windshield, a rear window, side window or roof window, or as a window in an aircraft, in a train or in a building.

Effect of the Invention

The present invention provides a glazing providing faster defogging or defrosting in a required region. The region may be a viewing region of a vehicle windshield for a driver or a device capable of obtaining information from outside the vehicle such as a camera. With the invention, the camera is ready before the driver. An Advanced Driver Assistance System (ADAS) depending on the camera for information is enabled to be ready before the driver.

The present invention provides a method for manufacturing said glazing which is simpler than conventional methods. The present invention does not need a transfer sheet and corresponding method steps for transferring to a glazing.

DETAILED DESCRIPTION OF THE DRAWINGS

Figure 1:
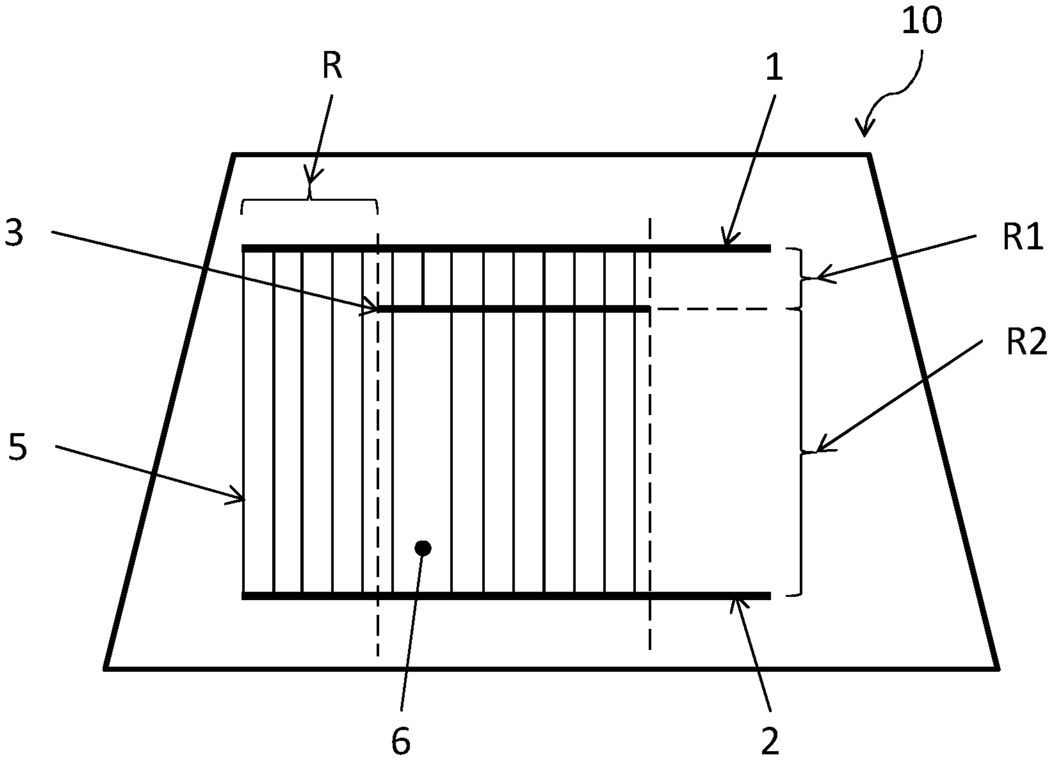
FIG. 1 is a glazing according to the invention having three busbars.

The following is a description with reference to the drawings, wherein reference numerals have the same meaning throughout.

FIG. 1 is a plan view of a glazing 10 according to the invention having conductors 5 for electrically heating the glazing. The glazing 10 is generally trapezoidal in shape, suitable for a vehicle windshield.

First busbar 1 and second busbar 2 are provided, shown adjacent upper and lower edges of the glazing 1 for connection to an external electrical supply (not shown). A third busbar 3 is positioned between first and second busbars, shown as parallel to and closer to first busbar 1. Conductors 5 are electrically connected to the first busbar 1.

A first group of conductors extends from the first busbar 1 to the third busbar 3 to form a first resistor R1. A second group of conductors extends from a side of the third busbar 3 facing the second busbar 2 and is electrically connected to the second busbar 2 to form a second resistor R2. First resistor 1 and second resistor 2 are electrically in series forming a series combination so the same current flows through resistor 1 and resistor 2.

Fewer conductors extend from a side of the third busbar 3 facing the second busbar 2 than extend from a side of the third busbar 3 facing the first busbar 1. One of the conductors of the second resistor R2 has been removed to form a gap 6.

A parallel resistor R is arranged to one side of first and second resistors R1, R2 and is electrically in parallel with them so that the same voltage is applied to parallel resistor R and the series combination of first and second resistors R1, R2. Parallel resistor R is connected to first and second busbars 1, 2, in the same way as the series combination of first and second resistors R1, R2.

Figure 2:
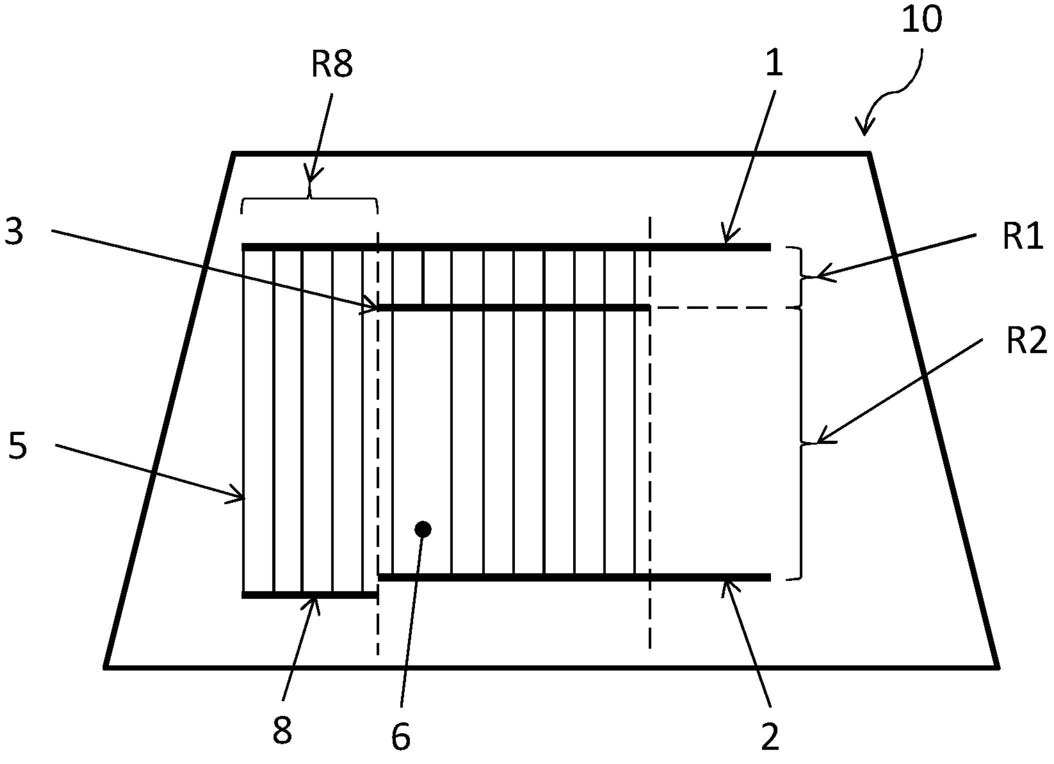
FIG. 2 is a glazing according to the invention having a split busbar.

FIG. 2 is a plan view of another glazing 10 according to the invention. It differs from FIG. 1 in that a split busbar 8 is provided so that a split busbar parallel resistor R8 can have a different distance between busbars than the series combination of first and second resistors R1, R2. Split busbar parallel resistor R8 can optionally be electrically connected to second busbar 2, so that it is electrically in parallel with the series combination of first and second resistors R1, R2.

Figure 3:
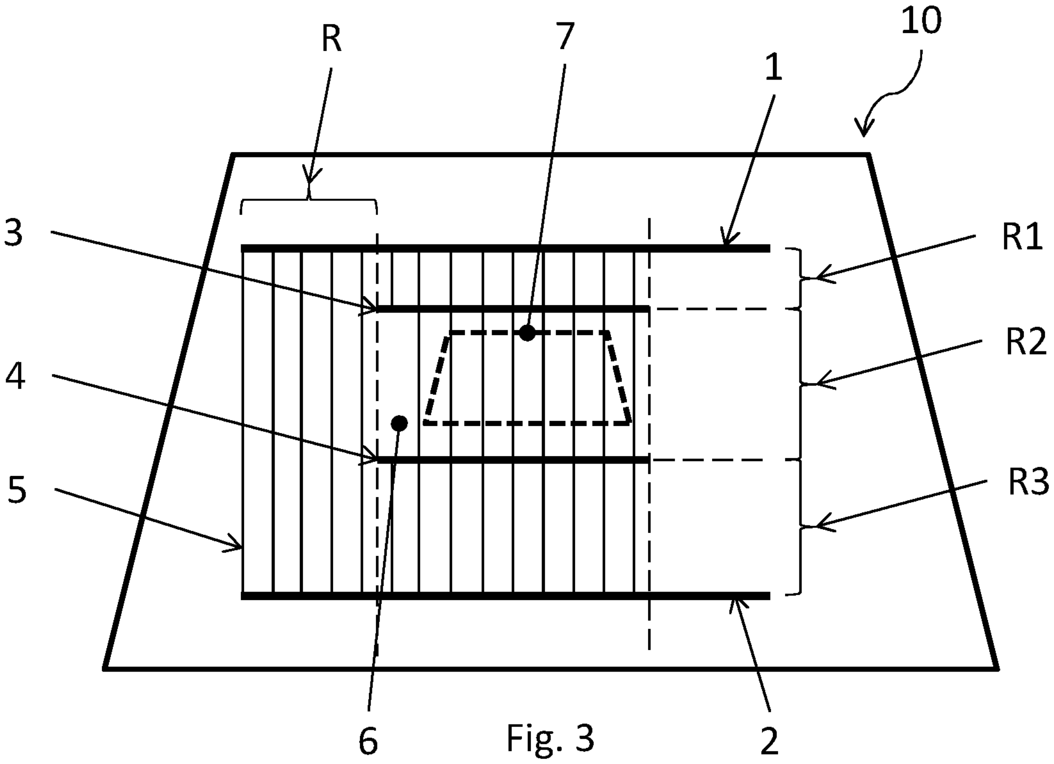
FIG. 3 is a glazing according to the invention having four busbars and one gap.

FIG. 3 is a plan view of a glazing 10 according to the invention. It differs from FIG. 1 by having a fourth busbar 4 positioned between the third busbar 3 and the second busbar 2. The second group of conductors extends to the fourth busbar 4 to form the second resistor R2. A third group of conductors extends from the fourth busbar to the second busbar to form a third resistor R3. An information acquisition area 7 is positioned in second resistor R2. A gap 6 is positioned in second resistor R2 outside the information acquisition area 7.

Figure 4:
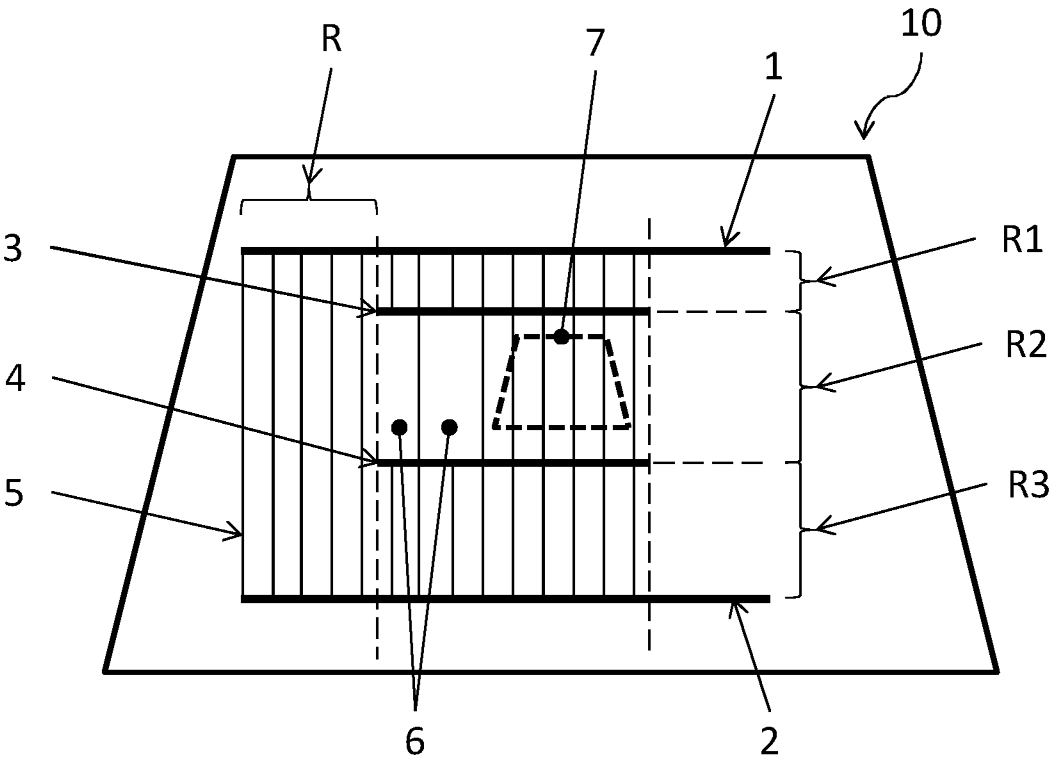
FIG. 4 is a glazing according to the invention having two gaps.

FIG. 4 is a plan view of a glazing 10 according to the invention. It differs from FIG. 3 by having two gaps 6 in second resistor R2 outside the information acquisition area 7, on one side thereof. The two gaps 6 are separated by one conductor 5.

Figure 5:
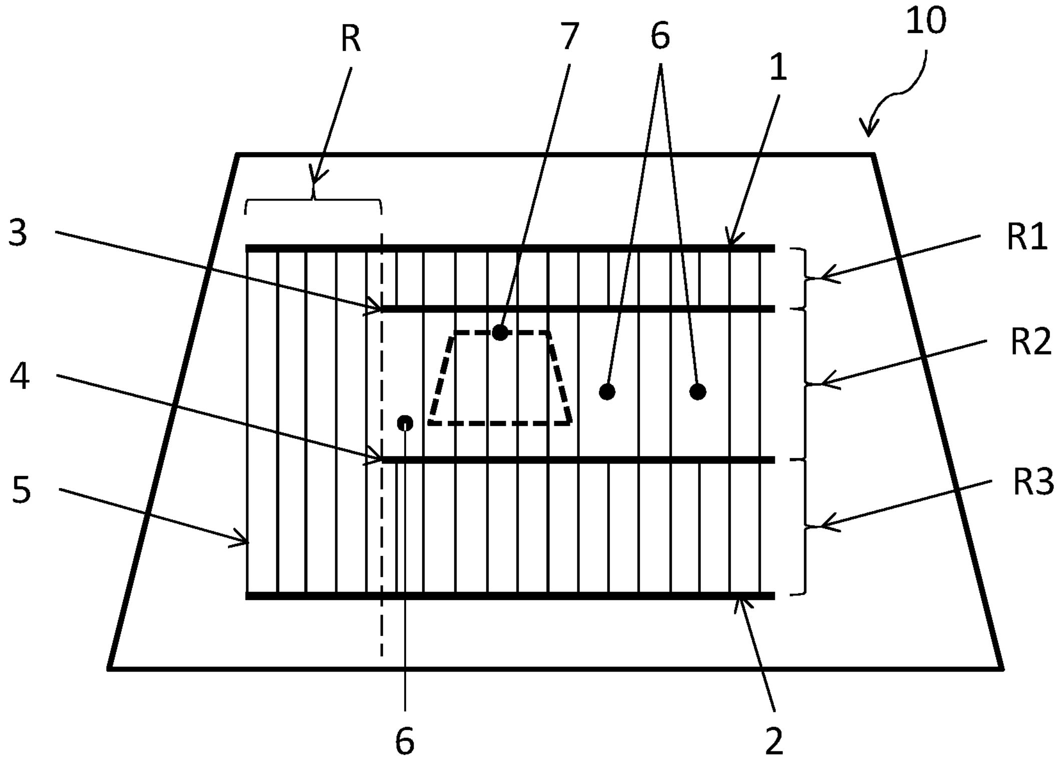
FIG. 5 is a glazing according to the invention having three gaps.

FIG. 5 is a plan view of a glazing 10 according to the invention. It differs from FIG. 4 by having three gaps 6 in second resistor R2 outside the information acquisition area 7, one on one side thereof and two on the other side, separated by two conductors 5.

Figure 6:
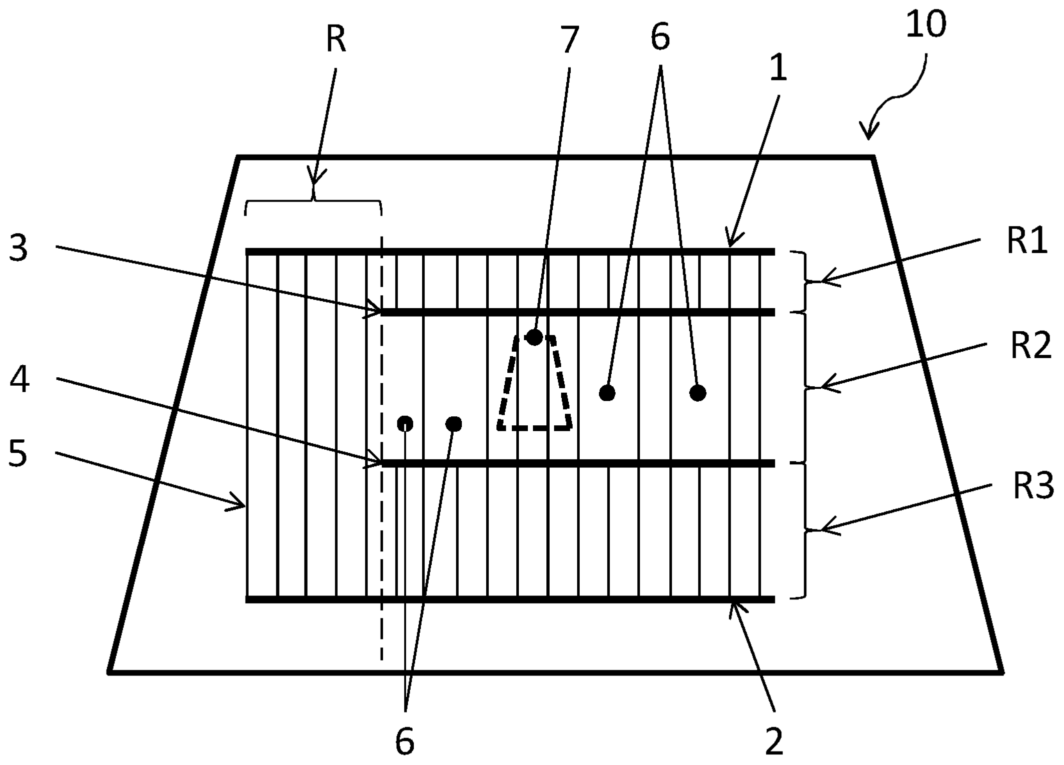
FIG. 6 is a glazing according to the invention having four gaps.

FIG. 6 is a plan view of a glazing 10 according to the invention. It differs from FIG. 5 by having four gaps 6 in second resistor R2 outside the information acquisition area 7, two on one side thereof, separated by one conductor 5, and two on the other side, separated by two conductors 5. Only a small number of conductors 5 are shown for clarity. Not all conductors 5 are shown. Combinations of number of gaps 6 and number of conductors 5 between the gaps 6 are not limited. Notwithstanding, removing too many conductors 5 such that a wide gap 6 is formed resulting in an unheated cold spot outside the information acquisition area 7 would be undesirable if, for example, wipers are unable to clear a windshield.

Figure 7:
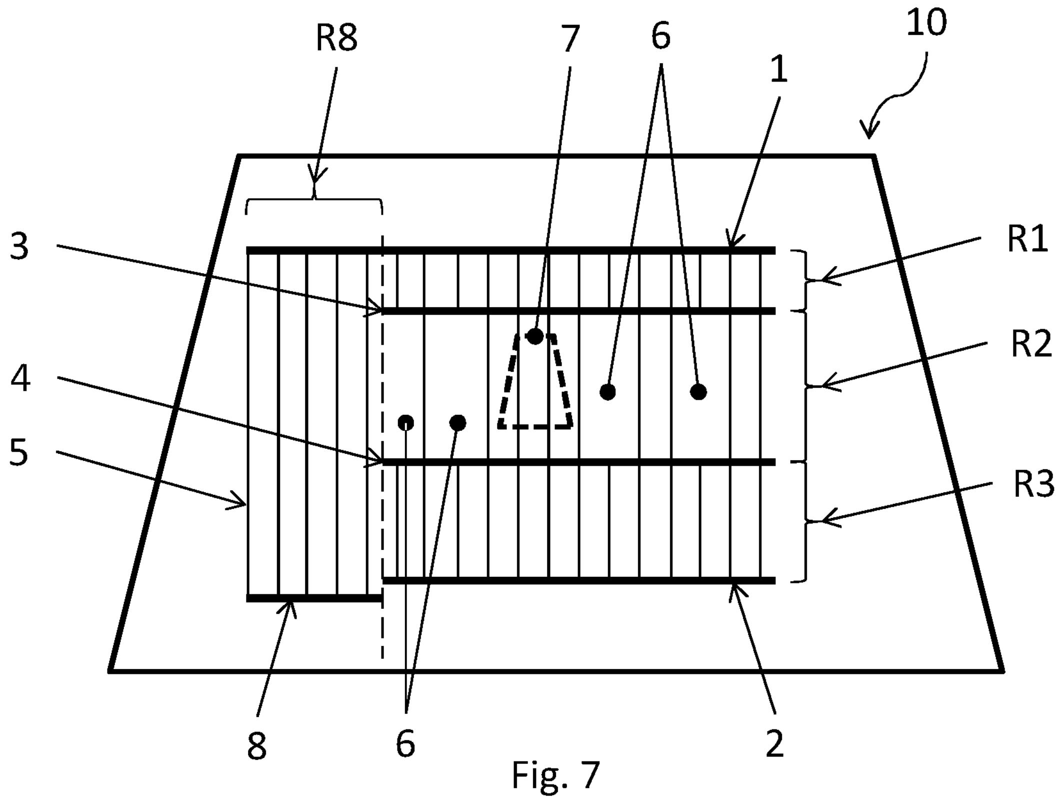
FIG. 7 is a glazing according to the invention having four gaps and a split busbar.

FIG. 7 is a plan view of a glazing 10 according to the invention. It differs from FIG. 6 by having a split busbar 8 and split busbar parallel resistor R8 like FIG. 2.

Figure 8:
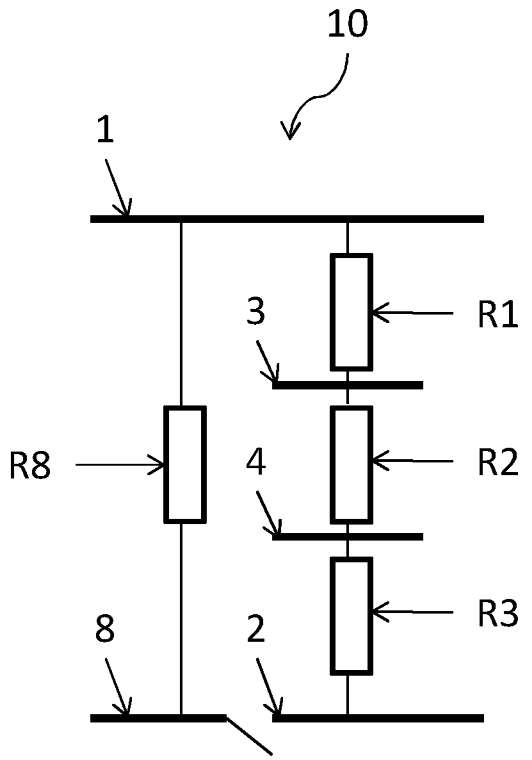
FIG. 8 is an equivalent circuit of the glazing of FIG. 7.

FIG. 8 is a circuit diagram of a glazing 10 according to the invention corresponding to FIG. 7. An optional switch is for an optional electrical connection (not shown in FIG. 7) so that split busbar parallel resistor R8 can be electrically in parallel with the series combination of first and second resistors R1, R2.

Figure 9:
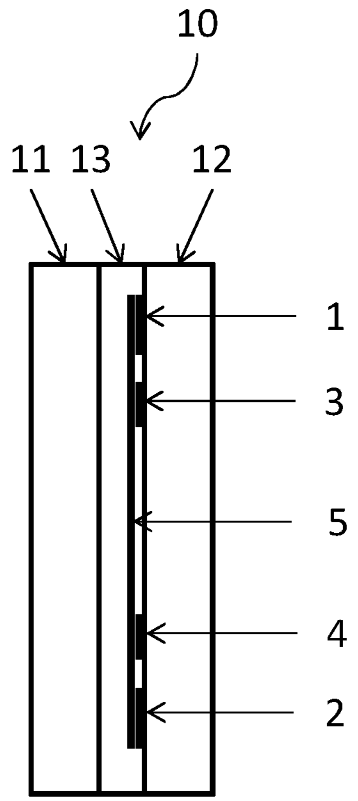
FIG. 9 is a cross-section of a laminated glass according to the invention.

FIG. 9 is a cross-section of a glazing 10 according to the invention corresponding to FIG. 3 to FIG. 7. Outer ply of glazing material 11 and inner ply of glazing material 12 have a ply of interlayer material 13 between.

EXAMPLES

The following is a description of non-limiting examples of the present invention.

Table 1 shows results of a first simulation of a glazing generally as FIG. 1 to FIG. 9 of nominal power density 600 $W/m^2$. Power density in a required region can be increased to 1,228 $W/m^2$ by having up to twelve fewer conductors in an adjacent region of width 30 mm outside the required region but still in the second resistor R2. Number of conductors inside the required region is 23, so total number of conductors in the first resistor R1 is 35. Alternatively, removing two conductors, one each to the left and right of the required region, increases power density to 665 $W/m^2$.

Table 1 discloses increased power density for a comparative example having no conductors removed (gaps) and four examples having between two and twelve fewer conductors in the second resistor R2 than in the first resistor R1.

TABLE 1

| | Comparative example | Example 1 | Example 2 | Example 3 | Example 4 |
|---|---|---|---|---|---|
| Number of conductors fewer (gaps) outside information acquisition area | 0 | 2 | 4 | 8 | 12 |
| Conductors remaining outside information acquisition area | 12 | 10 | 8 | 4 | 0 |
| Power density above/below information acquisition area | 600 | 595 | 590 | 578 | 563 |
| Power density in information acquisition area | 600 | 665 | 741 | 939 | 1,228 |

Table 2 shows results of a second simulation of a glazing generally as FIG. 3 to FIG. 6 having nominal power density 600 $W/m^2$. Power density can be increased in a required region to 742 $W/m^2$ by having four fewer conductors in an adjacent region of width 10 mm outside the required region but still in the second resistor R2. Number of conductors inside the required region is 32, so total number of conductors in the first resistor R1, and in the third resistor R3, is 36.

Table 2 discloses increased power density for the example having four conductors removed (gaps) in an information acquisition area and having a distance from the second resistor to the first busbar different from a distance from the second resistor to the second busbar.

TABLE 2

| | Parallel resistor R | First resistor R1 | Second resistor R2 | Third resistor R3 | Series combination R1 + R2 + R3 |
|---|---|---|---|---|---|
| Distance between busbars (mm) | 886 | 56 | 59 | 771 | 886 |
| Width (mm) | 522 | 93 | 93 | 93 | 93 |
| Number of conductors fewer | 0 | 0 | 4 | 0 | N/A |
| Conductors remaining | 201 | 36 | 32 | 36 | N/A |
| Resistance (ohms) | 0.548 | 0.194 | 0.229 | 2.675 | 3.098 |
| Power density ($W/m^2$) | 600 | 591 | 742 | 591 | N/A |

Table 2 shows that power density above/below the second resistor R2 is 591 $W/m^2$. To achieve the nominal power density across the glazing the split busbar 8 of FIG. 2 or FIG. 7 is required, so that the distance between busbars for the split busbar parallel resistor and the series combination R1, R2, R3 can be different.

Table 3 discloses results of a third simulation of a glazing generally as FIG. 7 having nominal power density 600

W/m². Power density can be increased in a required region to 753 W/m² by having four fewer conductors in an adjacent region of width 10 mm outside the required region but still in the second resistor R2. Number of conductors inside the required region is 32, so total number of conductors in the first resistor R1, and in the third resistor R3, is 36. Differences compared with Table 2 are underlined.

TABLE 3

| | Parallel resistor R | First resistor R1 | Second resistor R2 | Third resistor R3 | Series combination R1 + R2 + R3 |
|---|---|---|---|---|---|
| Distance between busbars (mm) | 886 | 56 | 59 | 764 | 879 |
| Width (mm) | 522 | 93 | 93 | 93 | 93 |
| Number of conductors fewer | 0 | 0 | 4 | 0 | N/A |
| Conductors remaining | 201 | 36 | 32 | 36 | N/A |
| Resistance (ohms) | 0.548 | 0.194 | 0.229 | 2.651 | 3.074 |
| Power density (W/m²) | 600 | 600 | 753 | 600 | N/A |

Difference in distance between busbars is 886−879=7 mm. Reducing the distance between busbars in the series combination R1, R2, R3 compared with the distance between busbars in the parallel resistor restores nominal power density to first and third resistors to compensate for the increased resistance of the second resistor due to the fewer conductors therein.

In all simulations the applied voltage is 12.33 volts. Conductor spacing is 2.6 mm. Conductors are simulated as wires of resistivity 116 ohms/m and having increased path length due to crimped shape of 107%.

The present invention may have any number of required regions having fewer conductors extending from the side of an additional busbar facing the second busbar than extend from a side of the additional busbar facing the first busbar. Two or more regions may be spaced across the width of the glazing, for example left and right for stereo cameras. Two or more regions may be spaced along the height of the glazing, for example a series combination of first, second, third, fourth and fifth resistors having third, fourth, fifth and sixth busbars between them. Second and fourth resistors have fewer conductors, providing higher power density in two regions, for example at top and bottom of the glazing.

First and second groups of conductors may be partly formed by a plurality of continuous wires which are partly overlapped by at least first, second and third busbars.

The method of manufacturing may comprise a step of embedding a plurality of conductors in the form of continuous wires in a ply of interlayer material. Preferably, sections of selected continuous wires between the third busbar and the second busbar or the fourth busbar are cut and removed.

First, second and third examples according to the invention and one comparative example were made. The examples were as FIG. 5 but had two, four and five wires removed in each respective second group of conductors. Gaps due to wire removal were positioned outside the information acquisition area. Gaps were left and right, two left and two right, two left and three right, respectively. The comparative example had no wires removed.

In a standard defrost test known in the art, time required for the information acquisition area to reach the temperature 0° was measured for each example relative to the time required for the comparative example. The first example was 30 seconds faster, the second example was 60 seconds faster and the third example was 80 seconds faster.

REFERENCE NUMERALS IN THE DRAWINGS

1, 2, 3, 4: First, second, third, fourth busbar
5: Conductors
6: Gap
7: Information acquisition area
8: Split busbar
10: Glazing
11: Outer ply of glazing material
12: Inner ply of glazing material
13: Ply of interlayer material
R: Parallel resistor
R1, R2, R3: First, second, third resistor
R8: Split busbar parallel resistor

The invention claimed is:

1. A glazing comprising:

first and second busbars for connection to an electrical supply;

a third busbar positioned between the first and second busbars;

a plurality of conductors electrically connected to the first busbar; wherein:

the plurality of conductors includes a first group of conductors extending from the first busbar to the third busbar to form a first resistor;

the plurality of conductors includes luges a second group of conductors extending from a side of the third busbar facing the second busbar and is electrically connected to the second busbar to form a second resistor;

wherein fewer conductors extend from the side of the third busbar facing the second busbar than extend from a side of the third busbar facing the first busbar;

at least one gap on one side of the third busbar opposite a conductor on the other side;

an information acquisition area arranged between the third busbar and the second busbar;

wherein the at least one gap is positioned outside the information acquisition area; and wherein a group of conductors extends from the first busbar to:

the second busbar to form a parallel resistor, or a split bus bar to form a split busbar parallel resistor and a distance between the first busbar and the split busbar is selected to be different from a distance between the first busbar and the second busbar.

2. A glazing according to claim 1, comprising a fourth busbar positioned between the third busbar and the second busbar wherein:

the second group of conductors extends to the fourth busbar to form the second resistor;

a third group of conductors extends from the fourth busbar to the second busbar to form a third resistor.

3. A glazing according to claim 2, wherein more conductors extend from a side of the fourth busbar facing the second busbar than extend from a side of the fourth busbar facing the third busbar.

4. A glazing according to claim 1, wherein the information acquisition area is arranged between the third busbar and the fourth busbar.

5. A glazing according to claim 1, wherein fewer conductors extend from a side of the third busbar facing the second busbar than extend from a side of the third busbar facing the first busbar outside the information acquisition area.

6. A glazing according to claim 1, wherein the conductors are heating wires.

7. A glazing according to claim 1, wherein a power density in a region of the second resistor is greater than a power density of the first resistor or the parallel resistor or the split busbar parallel resistor, or any combination thereof.

8. A glazing according to claim 1, comprising outer and inner plies of glazing material and a ply of interlayer material therebetween to form a laminated glass wherein first and second resistors are between the ply of interlayer material and the inner ply of glazing material.

9. Use of a glazing according to claim 1, in a motor vehicle as a windshield, a rear window, side window or roof window, or as a window in an aircraft, in a train or in a building.

10. A method of manufacturing a glazing, comprising:

providing first and second busbars for connecting to an electrical supply;

positioning a third busbar between the first and second busbars;

electrically connecting a plurality of conductors to the first busbar;

extending a first group of the plurality of conductors from the first busbar to the third busbar to form a first resistor;

extending a second group of the plurality of conductors from a side of the third busbar facing the second busbar and electrically connecting said second group of conductors to the second busbar to form a second resistor;

wherein fewer conductors extend from the side of the third busbar facing the second busbar than extend from a side of the third busbar facing the first busbar;

removing at least a part of at least one conductor on one side of the third busbar to form at least one gap on one side of the third busbar opposite a conductor on the other side;

arranging an information acquisition area between the third busbar and the second busbar; and positioning the at least one gap outside the information acquisition area; and positioning a group of conductors to extend from the first busbar to:

the second busbar to form a parallel resistor, or a split busbar to form a split busbar parallel resistor and a distance between the first busbar and the split busbar is selected to be different from a distance between the first busbar and the second busbar.

* * * * *